(12) United States Patent
Patel et al.

(10) Patent No.: US 12,013,030 B1
(45) Date of Patent: Jun. 18, 2024

(54) VEHICLE TORQUE CONVERTER MODELING AND CONTROL TECHNIQUES

(71) Applicant: FCA US LLC, Auburn Hills, MI (US)

(72) Inventors: Nadirsh Patel, Farmington Hills, MI (US); Andryas Mawardi, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/499,819

(22) Filed: Nov. 1, 2023

(51) Int. Cl.
    *F16H 61/14*     (2006.01)
    *F16H 61/4183*     (2010.01)
    *F16H 59/46*     (2006.01)

(52) U.S. Cl.
    CPC ....... *F16H 61/4183* (2013.01); *F16H 61/143* (2013.01); *F16H 2059/467* (2013.01)

(58) Field of Classification Search
    CPC .............. F16H 61/143; F16H 61/4183; F16H 2059/467
    See application file for complete search history.

(56) References Cited

U.S. PATENT DOCUMENTS

| | | | |
|---|---|---|---|
| 8,954,215 B2 | 2/2015 | Yamazaki et al. | |
| 9,108,614 B2 | 8/2015 | Doering et al. | |
| 9,260,107 B2 | 2/2016 | Doering et al. | |
| 9,656,665 B2 | 5/2017 | Pietron et al. | |
| 10,525,967 B2 | 1/2020 | Pietron et al. | |
| 10,960,882 B2 | 3/2021 | Ruybal et al. | |
| 2012/0130574 A1* | 5/2012 | Swales .................. | F16H 61/143 180/65.265 |
| 2017/0292594 A1* | 10/2017 | Zhang .................. | F16H 61/143 |

* cited by examiner

*Primary Examiner* — Lori Wu
(74) *Attorney, Agent, or Firm* — Jeremy J. Klobucar

(57) ABSTRACT

Techniques modeling and controlling a torque converter of a vehicle include accessing a look-up table relating (i) various K-factors of a turbine of the torque converter to (ii) various K-factors of an impeller of the torque converter, speed ratios of the torque converter, and torque ratios of the torque converter, calculating a K-factor of the turbine based on the set of parameters, determining a speed ratio and a torque ratio of the torque converter based on the calculated turbine K-factor using the look-up table, determining a target speed and a target torque for the impeller based on the determined speed and torque ratios of the torque converter, and controlling a torque generating system including the torque converter to achieve the target impeller speed and torque to thereby achieve the torque request at a driveline and mitigate or eliminate noise/vibration/harshness (NVH).

12 Claims, 2 Drawing Sheets

VEHICLE TORQUE CONVERTER MODELING AND CONTROL TECHNIQUES

FIELD

The present application generally relates to vehicle torque converters and, more particularly, to vehicle torque converter modeling and control techniques.

BACKGROUND

A torque converter is a fluid coupling device that includes an impeller/housing coupled to a driven shaft (e.g., an engine crankshaft or flywheel) and a fluid-driven turbine coupled to an input shaft of an automatic transmission. Torque converter data is typically collected from empirical testing (i.e., raw data) and used to model the torque converter in the forward direction, but this is not particularly useful for control purposes. This is because there is no way to calculate desired torque across a slipping torque converter (i.e., when a torque converter clutch, or TCC, is unlocked). Thus, existing vehicle systems control torque converter input or impeller torque and not transmission output shaft or wheel torque directly. This can result in inconsistent vehicle acceleration/feel depending on the torque converter's state, which could be noticeable to the consumer as noise/vibration/harshness (NVH). Accordingly, while such conventional torque converter modeling and control systems do work for their intended purpose, there exists an opportunity for improvement in the relevant art.

SUMMARY

According to one example aspect of the invention, a control system for modeling and controlling a torque converter of a vehicle is presented. In one exemplary implementation, the control system comprises a set of sensors configured to monitor a set of parameters including a vehicle speed, a torque request for a driveline of the vehicle, a state of the torque converter, and a gear ratio of an automatic transmission connected between a turbine of the torque converter and the driveline, wherein the torque converter further includes an impeller fluidly connected to a driven shaft of a torque generating system of the vehicle, and a controller configured to access a look-up table relating (i) various K-factors of the turbine to (ii) various K-factors of the impeller, speed ratios of the torque converter, and torque ratios of the torque converter, based on the set of parameters, calculate a K-factor of the turbine, determine a speed ratio and a torque ratio of the torque converter based on the calculated turbine K-factor using the look-up table, determine a target speed and a target torque for the impeller based on the determined speed and torque ratios of the torque converter, and control the torque generating system to achieve the target impeller speed and torque to thereby achieve the torque request at the driveline and mitigate or eliminate noise/vibration/harshness (NVH) corresponding to inconsistent acceleration/feel of the vehicle by a driver.

In some implementations, the torque generating system includes an internal combustion engine and the driven shaft is a crankshaft or flywheel of the engine. In some implementations, the engine and automatic transmission are configured to drive a first axle of the driveline of the vehicle, a first electric motor is configured to selectively drive the engine, and a second electric motor is configured to selectively drive a different second axle of the driveline of the vehicle.

In some implementations, the look-up table is predetermined based on raw data obtained via empirical testing. In some implementations, the look-up table is subsequently modified to further include the various turbine K-factors. In some implementations, the impeller K-factor equals impeller speed divided by a square root of impeller torque, the torque converter speed ratio equals turbine speed divided by impeller speed, the torque converter torque ratio equals turbine torque divided by impeller torque, and the turbine K-factor equals a product of (i) the impeller K-factor and (ii) the torque converter speed ratio divided by a square root of the torque converter torque ratio.

According to another example aspect of the invention, a control method for modeling and controlling a torque converter of a vehicle is presented. In one exemplary implementation, the control method comprises providing a set of sensors configured to monitor a set of parameters including a vehicle speed, a torque request for a driveline of the vehicle, a state of the torque converter, and a gear ratio of an automatic transmission connected between a turbine of the torque converter and the driveline, wherein the torque converter further includes an impeller fluidly connected to a driven shaft of a torque generating system of the vehicle, accessing, by a controller, a look-up table relating (i) various K-factors of the turbine to (ii) various K-factors of the impeller, speed ratios of the torque converter, and torque ratios of the torque converter, calculating, by the controller, a K-factor of the turbine based on the set of parameters, determining, by the controller, a speed ratio and a torque ratio of the torque converter based on the calculated turbine K-factor using the look-up table, determining, by the controller, a target speed and a target torque for the impeller based on the determined speed and torque ratios of the torque converter, and controlling, by the controller, the torque generating system to achieve the target impeller speed and torque to thereby achieve the torque request at the driveline and mitigate or eliminate NVH corresponding to inconsistent acceleration/feel of the vehicle by a driver.

In some implementations, the torque generating system includes an internal combustion engine and the driven shaft is a crankshaft or flywheel of the engine. In some implementations, the engine and automatic transmission are configured to drive a first axle of the driveline of the vehicle, a first electric motor is configured to selectively drive the engine, and a second electric motor is configured to selectively drive a different second axle of the driveline of the vehicle.

In some implementations, the look-up table is predetermined based on raw data obtained via empirical testing. In some implementations, the look-up table is subsequently modified to further include the various turbine K-factors. In some implementations, the impeller K-factor equals impeller speed divided by a square root of impeller torque, the torque converter speed ratio equals turbine speed divided by impeller speed, the torque converter torque ratio equals turbine torque divided by impeller torque, and the turbine K-factor equals a product of (i) the impeller K-factor and (ii) the torque converter speed ratio divided by a square root of the torque converter torque ratio.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
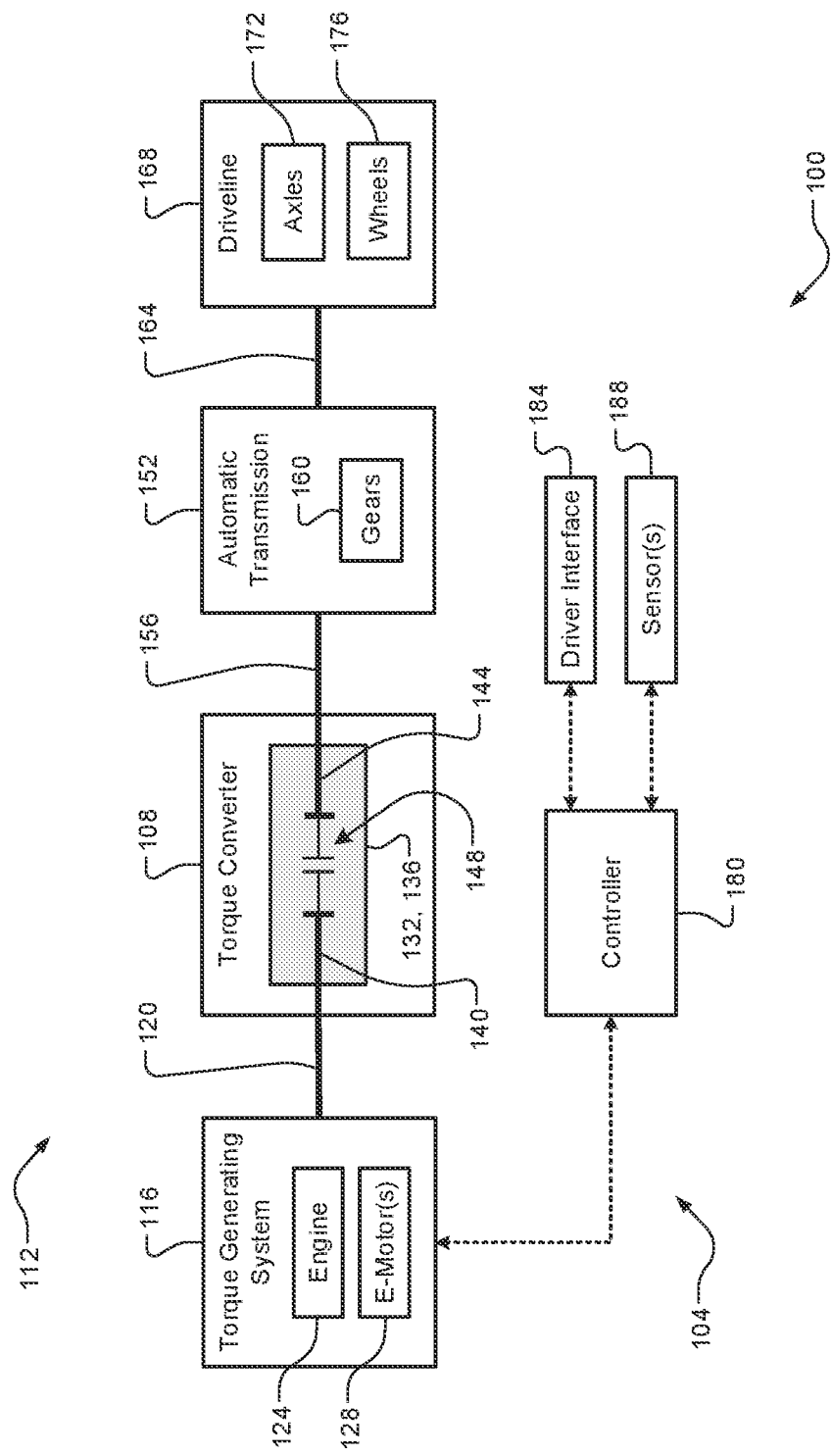
FIG. 1 is a functional block diagram of a vehicle having an example control system for modeling and controlling a torque converter according to the principles of the present application.

As previously discussed, existing vehicle systems control torque converter input or impeller torque and not automatic transmission output shaft or wheel torque directly. This is because conventional vehicle control systems are only capable of modeling the torque converter only in a forward direction. Example Table 1 (below) could be generated, for example, based on raw data obtained during empirical vehicle testing. This raw data is collected and used to determine certain torque converter parameters. This table could also be described as an old or unmodified look-up table as it is configured for forward-only torque converter modeling. As shown, it relates torque converter speed and torque ratios (SR and TR, respectively) to a K-factor for the torque converter impeller ($K_{IMP}$) and a torque converter efficiency.

TABLE 1

| Speed Ratio (SR) | Torque Ratio (TR) | Impeller K-Factor ($K_{IMP}$) | Efficiency |
|---|---|---|---|
| 0.000 | 1.872 | 171.0 | 0.0 |
| 0.100 | 1.758 | 170.0 | 17.6 |
| 0.200 | 1.645 | 169.0 | 32.9 |
| 0.300 | 1.537 | 169.0 | 46.1 |
| 0.400 | 1.422 | 166.0 | 56.9 |
| 0.500 | 1.327 | 166.0 | 66.4 |
| 0.600 | 1.234 | 175.0 | 74.0 |
| 0.700 | 1.140 | 191.0 | 79.8 |
| 0.721 | 1.123 | 195.0 | 81.0 |
| 0.751 | 1.094 | 203.0 | 82.2 |
| 0.784 | 1.060 | 210.0 | 83.1 |
| 0.800 | 1.042 | 212.0 | 83.4 |
| 0.824 | 1.012 | 221.0 | 83.4 |
| 0.849 | 0.970 | 238.0 | 82.4 |
| 0.881 | 0.970 | 276.0 | 85.5 |
| 0.900 | 0.970 | 305.0 | 87.3 |
| 0.921 | 0.970 | 347.0 | 89.3 |
| 0.929 | 0.970 | 371.0 | 90.1 |
| 0.938 | 0.970 | 401.0 | 91.0 |
| 0.950 | 0.970 | 447.0 | 92.2 |
| 0.959 | 0.970 | 496.0 | 93.0 |
| 0.970 | 0.970 | 581.0 | 94.1 |
| 0.982 | 0.970 | 815.0 | 95.3 |
| 0.989 | 0.970 | 1066.0 | 95.9 |

The above values are determinable using the following physics equations relating the various interacting components.

$$SR = \frac{N_{TURB}}{N_{IMP}}, \quad (1)$$

$$TR = \frac{T_{TURB}}{T_{IMP}}, \text{ and} \quad (2)$$

$$K_{IMP} = \frac{N_{IMP}}{\sqrt{T_{IMP}}}, \quad (3)$$

where $N_{TURB}$ and $N_{IMP}$ represent torque converter turbine and impeller speeds, and $T_{TURB}$ and $T_{IMP}$ represent torque converter turbine and impeller torques. As discussed above, this only enables modeling in the forward direction and thus results in the driver-demanded torque (i.e., a driver torque request) being calculated at a driven shaft of a torque generating system (e.g., an engine crankshaft or flywheel), which is connected to the torque converter impeller. There remains a discrepancy or inconsistency, however, between the driver torque request and the actual wheel torque achieved by the vehicle. This can result in inconsistent vehicle acceleration/feel depending on the torque converter's state, which could be noticeable to the consumer as noise/vibration/harshness (NVH).

Thus, while these conventional torque converter modeling and control systems do work for their intended purpose, there exists an opportunity for improvement in the relevant art. Accordingly, improved torque converter modeling and control techniques are presented herein. These techniques model a vehicle torque converter in a "backwards" direction, which is effectively a new dimension that is generated from raw data gathered during empirical testing as described above. By applying physics, this new dimension is created and allows the backward look-up of torque converter states. Specifically, a new factor called $K_{TURB}$ is derived that is based on the impeller K-factor ($K_{IMP}$) and the speed/torque ratios (SR and TR) of the torque converter. A new look-up table can then be generated and used to control the vehicle to achieve a desired torque converter turbine (output) torque, which directly corresponds to the wheel torque via a gear ratio of the automatic transmission. Potential benefits include more consistent acceleration/feel and mitigate or eliminated NVH for the consumer.

Referring now to FIG. 1, a functional block diagram of a vehicle 100 having an example control system 104 for modeling and controlling a torque converter 108 according to the principles of the present application is illustrated. The vehicle 100 generally comprises a powertrain 112 configured to generate and transfer drive torque for vehicle propulsion. The powertrain 112 includes a torque generating system 116 configured to generate drive torque at a driven shaft 120. The torque generating system 116 could include an internal combustion engine 124 and/or one or more electric motors (e-motors) 128. For example only, the powertrain 112 could be an electrified powertrain having an engine 124 and a first electric motor 128a configured to assist/drive the engine 124 as an accessory-drive (e.g., a belt-driven starter-generator, or BSG) associated with a first vehicle axle and a second electric motor 128b associated with a different second vehicle axle. It will be appreciated, however, that the torque generating system 116 could have any suitable configuration, including engine-only or electric motor-only configurations.

The powertrain 112 further includes the torque converter 108. The driven shaft 120 of the torque generating system 116 is connected to a housing 132 (having a fluid 136 therein, such as oil) and an impeller 140. The rotational spinning of the impeller 140 fluidly drives (via the fluid 136) a turbine 144 of the torque converter 108. A torque converter clutch (TCC) 148 is selectively engageable to lock-up the torque converter 108 (i.e., to lock the impeller 140 and the turbine 144 together) in a locked mode or, when unlocked (e.g., during a slip mode), slippage is allowed between the impeller 140 and the turbine 144 (i.e., a change of rotational speeds therebetween). The powertrain 112 further includes an automatic transmission 152, which includes an input shaft 156 connected to the turbine 144 of the torque converter 108. The automatic transmission 152 includes a plurality of different gears 160 (e.g., a multi-speed automatic transmission) having different gear ratios for transferring (e.g., multiplying) torque from the input shaft 156 to an output shaft 164. The torque at the output shaft 164 of the automatic transmission 152 is then provided to a driveline 168 of the vehicle 100, such as to half shafts or axles 172 and, finally, to wheels/tires 176.

A controller 180 is configured to control operation of the vehicle 100, including primarily receiving a driver torque request via a driver interface 184 (e.g., an accelerator pedal) and controlling the powertrain 112 to generate and transfer the desired drive torque to the driveline 168, thereby satisfying the driver torque request. The controller 180 controls the powertrain 112 and its components based, for example, on measurements from one or more sensors 188 of the vehicle 100. Non-limiting examples of these sensor(s) 188 include a vehicle speed sensor, an automatic transmission gear sensor, a torque converter state sensor (e.g., TCC locked/unlocked), and speed sensors for any of the intermediary shafts/rotating components of the powertrain 112. The controller 180 is also configured to perform at least a portion of the torque converter modeling and control techniques of the present application, which will now be discussed in greater detail. First, the controller 180 is configured to access (e.g., from a local or remote memory) a new/modified look-up table relating (i) various K-factors of the turbine 144 (hereinafter, "$K_{TURB}$") to (ii) various K-factors of the impeller 140 ($K_{IMP}$), speed ratios (SR) of the torque converter 108, and torque ratios (TR) of the torque converter 108. The look-up table, an example of which is shown as Table 2 (below), could be predetermined during calibration/testing.

TABLE 2

| Speed Ratio (SR) | Torque Ratio (TR) | $K_{IMP}$ | Efficiency | $K_{TURB}$ |
|---|---|---|---|---|
| 0.000 | 1.872 | 171.0 | 0.0 | 0.0 |
| 0.100 | 1.758 | 170.0 | 17.6 | 12.8 |
| 0.200 | 1.645 | 169.0 | 32.9 | 26.4 |
| 0.300 | 1.537 | 169.0 | 46.1 | 40.9 |
| 0.400 | 1.422 | 166.0 | 56.9 | 55.7 |
| 0.500 | 1.327 | 166.0 | 66.4 | 72.1 |
| 0.600 | 1.234 | 175.0 | 74.0 | 94.5 |
| 0.700 | 1.140 | 191.0 | 79.8 | 125.2 |
| 0.721 | 1.123 | 195.0 | 81.0 | 132.7 |
| 0.751 | 1.094 | 203.0 | 82.2 | 145.8 |
| 0.784 | 1.060 | 210.0 | 83.1 | 159.9 |
| 0.800 | 1.042 | 212.0 | 83.4 | 166.1 |
| 0.824 | 1.012 | 221.0 | 83.4 | 181.0 |
| 0.849 | 0.970 | 238.0 | 82.4 | 205.2 |
| 0.881 | 0.970 | 276.0 | 85.5 | 246.9 |
| 0.900 | 0.970 | 305.0 | 87.3 | 278.7 |
| 0.921 | 0.970 | 347.0 | 89.3 | 324.5 |
| 0.929 | 0.970 | 371.0 | 90.1 | 349.9 |
| 0.938 | 0.970 | 401.0 | 91.0 | 381.9 |
| 0.950 | 0.970 | 447.0 | 92.2 | 431.2 |
| 0.959 | 0.970 | 496.0 | 93.0 | 483.0 |
| 0.970 | 0.970 | 581.0 | 94.1 | 572.2 |

TABLE 2-continued

| Speed Ratio (SR) | Torque Ratio (TR) | $K_{IMP}$ | Efficiency | $K_{TURB}$ |
|---|---|---|---|---|
| 0.982 | 0.970 | 815.0 | 95.3 | 812.6 |
| 0.989 | 0.970 | 1066.0 | 95.9 | 1070.5 |

This new parameter $K_{TURB}$ is derived as follows:

$$K_{IMP} = \frac{N_{IMP}}{\sqrt{T_{IMP}}}, \qquad (3)$$

$$K_{IMP} = \frac{\frac{N_{TURB}}{SR}}{\sqrt{\frac{T_{TURB}}{TR}}}, \qquad (4)$$

$$K_{IMP} = \frac{N_{TURB}}{\sqrt{T_{TURB}}} \times \frac{\sqrt{TR}}{SR}, \qquad (5)$$

$$K_{TURB} = \frac{N_{TURB}}{\sqrt{T_{TURB}}}, \qquad (6)$$

$$K_{IMP} = K_{TURB} \times \frac{\sqrt{TR}}{SR}, \text{ and} \qquad (7)$$

$$K_{TURB} = K_{IMP} \times \frac{SR}{\sqrt{TR}}. \qquad (8)$$

Now, utilizing this parameter $K_{TURB}$, the controller 180 is able to use the look-up table (e.g., Table 2) for control purposes, such as shown in the flow diagram of FIG. 3 and described in greater detail below.

Figure 2:
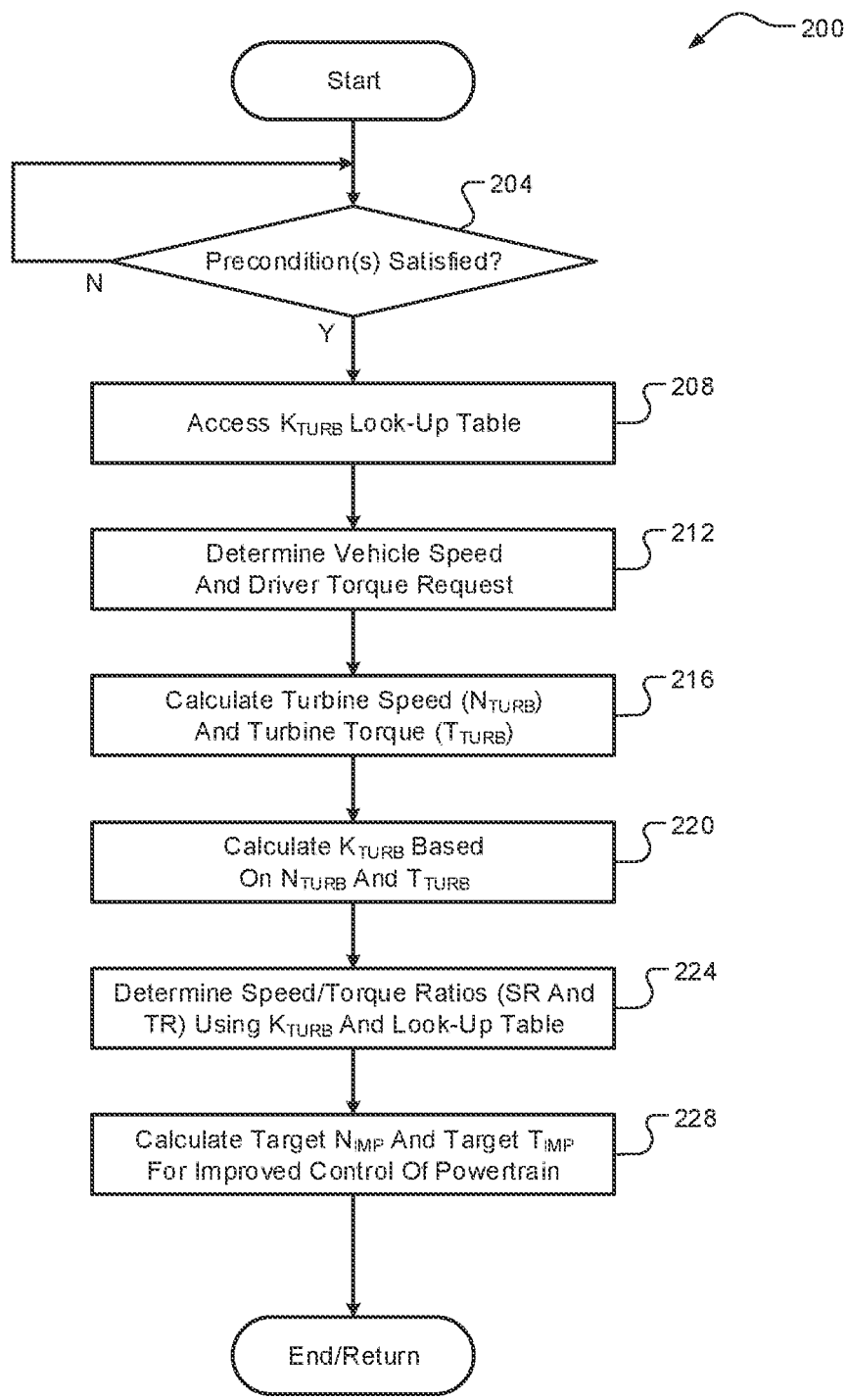
FIG. 2 is a flow diagram of an example torque converter modeling and control method for a vehicle according to the principles of the present application.

Referring now to FIG. 2, a flow diagram of an example control method 200 for modeling and controlling a torque converter of a vehicle according to the principles of the present application is illustrated. While the vehicle 100 and its components are specifically referenced for illustrative/descriptive purposes, it will be appreciated that the method 200 could be applicable to any suitably configured vehicle. At 204, the controller 180 determines whether an optional set of one or more preconditions are satisfied. These precondition(s) could include, for example, the vehicle 100 being powered-up and the powertrain 112 running and there being no malfunctions or faults present that would otherwise inhibit the operation of the vehicle 100 and, more particularly, the torque converter modeling and control techniques of the present application. When false, the method 200 ends or returns to 204. When true, the method 200 proceeds to 208. At 208, the controller 180 accesses or otherwise obtains the look-up table (e.g., Table 2) relating (i) various K-factors of the turbine 144 ($K_{TURB}$) to (ii) various K-factors of the impeller 140 ($K_{IMP}$), speed ratios (SR) of the torque converter 108, and torque ratios (TR) of the torque converter 108.

At 212, the controller 180 determines a set of parameters including vehicle speed and desired torque (i.e., the driver torque request) from the set of sensors 188 and the driver interface 184. At 216, the controller 180 calculates the speed of the turbine 144 ($N_{TURB}$) and the (desired) torque at the turbine 144 ($T_{TURB}$, through the current gear ratio of the automatic transmission 152) based on the set of parameters. At 220, the controller 180 calculates a K-factor of the turbine 144 ($K_{TURB}$) using the calculated turbine speed/torque. At 224, the controller 180 determines the speed and torque ratios SR and TR of the torque converter 108 using the calculated $K_{TURB}$ and the look-up table. At 228, the controller calculates, based on the speed and torque ratios SR, TR of the torque converter 108, a target speed of the impeller 140 ($N_{IMP}$) and a target torque for the impeller ($T_{IMP}$) that are used as for controlling the powertrain 112 to achieve the desired output torque at the driveline 164, with mitigated or eliminated NVH for the customer/driver. This could include, for example only, the controller 180 generating commands for the torque generating system 116 (and possible the TCC 148) to achieve the desired these desired parameters. The method 200 then ends or returns to 204.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for modeling and controlling a torque converter of a vehicle, the control system comprising:
    a set of sensors configured to monitor a set of parameters including a vehicle speed, a torque request for a driveline of the vehicle, a state of the torque converter, and a gear ratio of an automatic transmission connected between a turbine of the torque converter and the driveline, wherein the torque converter further includes an impeller fluidly connected to a driven shaft of a torque generating system of the vehicle; and
    a controller configured to:
        access a look-up table relating (i) various K-factors of the turbine to (ii) various K-factors of the impeller, speed ratios of the torque converter, and torque ratios of the torque converter;
        based on the set of parameters, calculate a K-factor of the turbine;
        determine a speed ratio and a torque ratio of the torque converter based on the calculated turbine K-factor using the look-up table;
        determine a target speed and a target torque for the impeller based on the determined speed and torque ratios of the torque converter; and
        control the torque generating system to achieve the target impeller speed and torque to thereby achieve the torque request at the driveline and mitigate or eliminate noise/vibration/harshness (NVH) corresponding to inconsistent acceleration/feel of the vehicle by a driver.

2. The control system of claim 1, wherein the torque generating system includes an internal combustion engine and the driven shaft is a crankshaft or flywheel of the engine.

3. The control system of claim 2, wherein:
    the engine and automatic transmission are configured to drive a first axle of the driveline of the vehicle;
    a first electric motor is configured to selectively drive the engine; and
    a second electric motor is configured to selectively drive a different second axle of the driveline of the vehicle.

4. The control system of claim 1, wherein the look-up table is predetermined based on raw data obtained via empirical testing.

5. The control system of claim 4, wherein the look-up table is subsequently modified to further include the various turbine K-factors.

6. The control system of claim 5, wherein the impeller K-factor equals impeller speed divided by a square root of impeller torque, the torque converter speed ratio equals turbine speed divided by impeller speed, the torque converter torque ratio equals turbine torque divided by impeller torque, and the turbine K-factor equals a product of (i) the impeller K-factor and (ii) the torque converter speed ratio divided by a square root of the torque converter torque ratio.

7. A control method for modeling and controlling a torque converter of a vehicle, the control method comprising:
    providing a set of sensors configured to monitor a set of parameters including a vehicle speed, a torque request for a driveline of the vehicle, a state of the torque converter, and a gear ratio of an automatic transmission connected between a turbine of the torque converter and the driveline, wherein the torque converter further includes an impeller fluidly connected to a driven shaft of a torque generating system of the vehicle;
    accessing, by a controller, a look-up table relating (i) various K-factors of the turbine to (ii) various K-factors of the impeller, speed ratios of the torque converter, and torque ratios of the torque converter;
    calculating, by the controller, a K-factor of the turbine based on the set of parameters;
    determining, by the controller, a speed ratio and a torque ratio of the torque converter based on the calculated turbine K-factor using the look-up table;
    determining, by the controller, a target speed and a target torque for the impeller based on the determined speed and torque ratios of the torque converter; and
    controlling, by the controller, the torque generating system to achieve the target impeller speed and torque to thereby achieve the torque request at the driveline and mitigate or eliminate noise/vibration/harshness (NVH) corresponding to inconsistent acceleration/feel of the vehicle by a driver.

8. The control method of claim 7, wherein the torque generating system includes an internal combustion engine and the driven shaft is a crankshaft or flywheel of the engine.

9. The control method of claim 8, wherein:
    the engine and automatic transmission are configured to drive a first axle of the driveline of the vehicle;
    a first electric motor is configured to selectively drive the engine; and
    a second electric motor is configured to selectively drive a different second axle of the driveline of the vehicle.

10. The control method of claim 7, wherein the look-up table is predetermined based on raw data obtained via empirical testing.

11. The control method of claim 10, wherein the look-up table is subsequently modified to further include the various turbine K-factors.

12. The control method of claim 11, wherein the impeller K-factor equals impeller speed divided by a square root of impeller torque, the torque converter speed ratio equals turbine speed divided by impeller speed, the torque converter torque ratio equals turbine torque divided by impeller torque, and the turbine K-factor equals a product of (i) the impeller K-factor and (ii) the torque converter speed ratio divided by a square root of the torque converter torque ratio.

* * * * *